United States Patent [19]

Masson

[11] Patent Number: 5,736,803
[45] Date of Patent: Apr. 7, 1998

[54] SYNCHRONOUS MACHINE ROTOR

[75] Inventor: André Masson, Aulnay, France

[73] Assignee: GEC Alsthom Transport SA, Paris, France

[21] Appl. No.: 306,597

[22] Filed: Sep. 15, 1994

[30] Foreign Application Priority Data

Sep. 21, 1993 [FR] France .................. 93 11233

[51] Int. Cl.[6] .................................. H02K 21/12
[52] U.S. Cl. ........................ 310/156; 310/261
[58] Field of Search .................. 310/261, 162, 310/183, 197, 263, 269, 214, 154, 156

[56] References Cited

U.S. PATENT DOCUMENTS

| | | | |
|---|---|---|---|
| 2,913,607 | 11/1959 | Douglas | 310/261 |
| 3,321,652 | 5/1967 | Opel | 310/168 |
| 3,793,546 | 2/1974 | King, Jr. | 310/183 |
| 4,296,544 | 10/1981 | Burgmeier et al. | 29/598 |
| 4,769,568 | 9/1988 | Kawamura | 310/156 |
| 4,899,074 | 2/1990 | West | 310/154 |
| 4,954,736 | 9/1990 | Kawamoto et al. | 310/156 |
| 5,001,378 | 3/1991 | Miller et al. | 310/178 |
| 5,063,318 | 11/1991 | Anderson | 310/156 |
| 5,170,085 | 12/1992 | Shinto | 310/156 |
| 5,510,662 | 4/1996 | Tanimoto et al. | 310/156 |

FOREIGN PATENT DOCUMENTS

| | | |
|---|---|---|
| 0096515A1 | 12/1983 | European Pat. Off. . |
| 0504093A1 | 9/1992 | European Pat. Off. . |
| 2057147 | 5/1971 | France . |
| 2082430 | 12/1971 | France . |

Primary Examiner—Thomas M. Dougherty
Assistant Examiner—Jonathan Link
Attorney, Agent, or Firm—Sughrue, Mion, Zinn, Macpeak & Seas, PLLC

[57] ABSTRACT

A synchronous machine rotor has a progressive magnetic airgap and a constant aerodynamic airgap.

17 Claims, 3 Drawing Sheets

SYNCHRONOUS MACHINE ROTOR

BACKGROUND OF THE INVENTION

1. Field of the Invention

The present invention concerns magneto-electric rotors in general and a synchronous machine rotor in particular.

2. Description of the Prior Art

Documents U.S. Pat. No. 3,321,652 (Lawrence G. Opel) and FR-A-2,057,147 (Norman Klimmek et al) disclose a heteropolar synchronous machine with a non-wound rotor and a stationary induction field.

The cited prior art describes a rotor for a high-speed synchronous machine.

A rotor of this kind must have a high resistance to centrifugal force, high stiffness in bending to limit vibration and high mechanical and thermal stability.

The entirely metal rotor is made up of magnetic steel parts and amagnetic metal parts assembled together. The peripheral surface of the rotor is preferably smooth and the shape of a solid of revolution to limit aerodynamic losses.

As the excitation winding is on the stator, the rotor is not heated by this winding. The rotor therefore suffers only from surface electromagnetic losses, which have to be limited.

The absence of significant losses in the rotor makes its mechanical and thermal balancing stable.

This synchronous machine combines numerous advantages which render it suitable for use at high speed and/or at high temperature.

The fixed excitation winding, being disposed on the stator, is not subject to any rotation loads and is therefore easier to cool by means of a gas or a liquid. The excitation winding does not require either slip-rings or brushes.

The finished rotor can be a single metal member made up of several parts, some magnetic and the other(s) amagnetic, assembled together with metallic continuity (solid rotor), total or major continuity for high speeds, partial continuity for standard speeds.

The rotor is not subject to losses due to an excitation winding and therefore requires no cooling passages.

The rotor can be made solid, and therefore rigid in bending and with a high critical speed, and resistant to centrifugal force. These two properties render it suitable for rotation at high speed.

The rotor can be made with a smooth external surface which is the shape of a solid of revolution in order to minimize losses by friction with the surrounding air or gas, or the surrounding liquid in the case a submerged rotor. This smooth external surface provides a constant aerodynamic airgap between the rotor surface and any given point of the stator interior.

Given that the rotor is of monolithic construction and is free of internal losses it is not subject to thermal distortion or to displacement of internal components and as a result of this its dynamic balancing is highly stable.

The rotor is resistant to the thermal stresses of its operating environment and can withstand temperatures up to around 300° C. without special provisions.

Mechanical strength, stiffness, monolithic construction and stable balancing all contribute to the high reliability of the rotor.

The structure of the rotors described in the prior art has a drawback, however.

The rotors described have a smooth external surface which is the shape of a solid of revolution with the important aim of reducing losses by friction with the surrounding air, gas or liquid.

As a result the magnetic airgap between the pole arcs and the stator is constant.

This machine is in the salient pole machine class. In the usual construction of salient pole rotors the external surface of the poles facing the stator bore leaves a minimal magnetic airgap between the magnetic surfaces on the polar axis and near the latter. The pole horns are rounded (ignoring any finer variations caused by the stator notches and any damper notches on the poles). Such a pole construction provides a constant magnetic airgap between the pole surface and the stator.

The constant magnetic airgap of the solid rotor of the prior art with tooth supports is not an overriding drawback when the machine operates with no load or with a light load. However, for operation on full load the magnetic airgap would be subject to concentration of the magnetic flux at a single tangential edge of each pole (this phenomenon is well known to designers of salient pole machines). This concentration is facilitated by the constant magnetic airgap whereas, in accordance with the invention, it would be attenuated by means of progressive magnetic airgap poles, and possibly poles with rounded or bevelled horns.

The major disadvantages of concentration of the flux at the tangential edge of the pole are:

In the concentration area the induction field is maximal in the pole and in the small stator arc facing it. If the limits of the magnetic materials constituting the rotor and the stator are reached in this area, they are not yet reached in the other areas, with the result that the structure is not used efficiently. Also, the iron losses are high because all the teeth see this high induction field successively.

If the induction field of the stator teeth in the flux concentration area is reduced by increasing the width of all the teeth, the mass of the teeth is increased and the cross-section available for the winding is reduced. This also means that the structure is used inefficiently.

The object of this application is to propose an improvement to the rotor with no windings and no brushes of the type of synchronous machine known as a solid rotor machine with tooth supports or a RICE-LUNDELL machine or a modified LUNDELL machine.

SUMMARY OF THE INVENTION

In accordance with one feature of the invention, the synchronous machine rotor has a progressive magnetic airgap and a constant aerodynamic airgap. That is, the conventional constant magnetic airgap is varied as described herein. This variation provides a magnetic airgap which is not constant, but progressive. The aerodynamic airgap, as revealed below, is maintained.

The invention also consists in a synchronous machine rotor having any of the following features:

- the poles include a curved surface at the center and a plane surface in at least one of said progressive magnetic airgap areas and at least one sharp edge,
- the poles include a curved surface at the center and a plane surface in at least one of said progressive magnetic airgap areas and at least one bevelled edge,
- the poles include a curved surface at the center and a plane surface in at least one of said progressive magnetic airgap areas and at least one rounded edge,
- the poles include a curved surface at the center and in at least one of said progressive magnetic airgap areas and at least one sharp edge,
- the poles include a curved surface at the center and in at least one of said progressive magnetic airgap areas and at least one bevelled edge, the poles include a curved surface at the center and in at least one of said progressive magnetic airgap areas and at least one rounded edge.

The invention also consists in a synchronous machine rotor in which the wedge members are complemented by lateral members to constitute a damper turn made from an electrically conductive amagnetic material.

The improvement increases the power by at least 20% for the same volume and increases the efficiency.

It is therefore highly beneficial to give the rotor a pole surface shape which approximates the standard shapes of salient poles whilst retaining the important advantage at high speeds resulting from the constant aerodynamic airgap.

Another advantage of the progressive magnetic airgap rotor of the invention is reduced concentration of flux at the tangential edge of the poles, reduced losses and increased power for a given mass.

In other words, the power and the efficiency are increased for a machine of a given volume and a given mass.

Other objects, features and advantages of the synchronous machine rotor will emerge from a reading of the following description of preferred embodiments of the invention given with reference to the appended drawings.

DETAILED DESCRIPTION OF THE PREFERRED EMBODIMENTS

Figure 1:
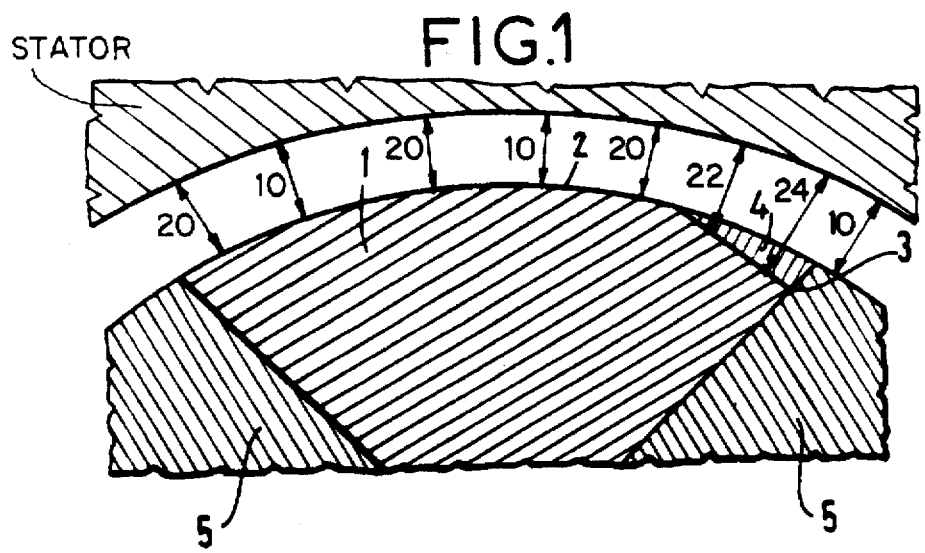
FIGS. 1 to 6 show various embodiments of progressive magnetic airgap poles of the invention in transverse cross-section.

In order to understand this detailed description, it is important to understand the concepts of the constant aerodynamic airgap, the constant magnetic airgap of the prior art, and the progressive magnetic airgap of the invention. FIG. 1 shows an embodiment of the invention, but serves to illustrate these three concepts. In FIG. 1, a pole 1, an amagnetic member 5, and an amagnetic member 4 of a rotor are operationally positioned with respect to a stator. Although the stator is only illustrated in FIG. 1, it will be understood that the description and concepts relate also to FIGS. 2–7.

In FIG. 1, the surface of the pole 1 is characterized by a smoothly curved part 2, and a plane surface part 9 which angles away from the smoothly curved part toward edge 3. The outer surface of the rotor, as distinguished from the surface of the pole 1, is defined by the outer surface of amagnetic member 5, the smoothly curved part 2 of pole 1, another amagnetic member 4, and the next amagnetic member 5. The outer surface of the rotor is a smooth surface all the way around. Thus, there are two surfaces of great importance. The first is the surface of the pole 1, and the second is the outer surface of the rotor. The former surface is important magnetically, and the latter is important aerodynamically.

Reference numeral 10 indicates the constant aerodynamic airgap between the surface of the rotor and the surface of the stator. Aerodynamically, the rotor has a smooth surface all the way around, and so the airgap between the outer surface of the rotor and the surface of the stator is constant. Thus, outer surface of the rotor has a constant aerodynamic airgap with respect to the surface of the stator.

Reference numeral 20 illustrates a portion of the surface 2 of pole 1 for explaining the concept of a constant magnetic airgap. The smoothly curved surface 2 of magnetic pole 1 has a constant magnetic airgap with respect to the surface of the stator. In the conventional rotor, the magnetic airgap between the surface of the pole and the stator is the same for any point on the surface of the pole 1. In other words, the conventional approach is to have a constant magnetic airgap 20 between the pole and the stator at every point of the surface of the pole.

In the below described embodiments of the invention, the magnetic airgap is progressive over at least part of the magnetic pole 1. Reference numeral 9 indicates a plane surface of magnetic pole 1 which angles away from the smoothly curved surface 2. Plane surface 9 ends at edge 3. Since magnetic pole 1 has a plane surface 9, it has a progressive magnetic airgap.

To explain further, reference numeral 22 indicates a magnetic airgap which is larger than the magnetic airgap 20. Reference numeral 24 indicates an even larger magnetic airgap than the magnetic airgap 22. That is, the magnetic airgap between the surface of the magnetic pole at 22 and the stator is larger than the magnetic airgap between the surface of the magnetic pole at 20 and the stator. The magnetic airgap at 24 is progressively larger with respect to the magnetic airgaps at 22 and 20. According to the invention, the magnetic pole has a progressive magnetic airgap. This means that the magnetic airgap does not stay the same at every point of the surface of the pole. Rather, the magnetic airgap gets larger over part of the surface of the pole. It will be understood that a part of a magnetic pole where the magnetic airgap is progressive is known as a progressive magnetic airgap area of the pole.

In this progressive magnetic airgap, according to the invention, amagnetic member 4 is disposed so that the aerodynamic airgap remains constant even though the magnetic airgap becomes progressively larger. The amagnetic member 4 thus acts as an aerodynamic filler to provide a smooth surface on the outer surface of the rotor. Since member 4 is amagnetic, the magnetic airgap remains progressive in the progressive magnetic airgap area.

With these concepts in mind, the following detailed description of the preferred embodiments will easily be grasped.

Standard salient poles usually have a profile which is symmetrical about the pole axis (i.e., provide a constant magnetic airgap.

This is necessary if the machine has to be able to rotate in both directions, so that either torque can be used with the same maximal performance.

The poles are preferably symmetrical even in machines with a single output torque direction. In standard salient pole machines the progressive magnetic airgap is obtained by appropriately shaping the laminations. The resulting poles are then no more costly than poles with a progressive magnetic airgap on one side only.

For solid rotor machines with tooth supports and with one output torque direction, such as turbo-alternators or motor-driven compressors, for example, it is more economical to provide the progressive magnetic airgap only at the active side of the poles.

The synchronous machine rotor of the invention can thus have a progressive magnetic airgap on one side only of at least one pole.

The progressive magnetic airgap is obtained by milling the poles either before or after they are welded or otherwise assembled together.

The central area of the pole surface (i.e., the curved surface at the center of the pole, as opposed to the portion of the pole surface in which the progressive magnetic airgap is formed) is left with a constant magnetic airgap subtending a given angle.

The pole surface flanking the progressive magnetic airgap is ordinarily a plane surface, which is simple to machine, but it is also feasible to machine a curved cylindrical surface whereby the magnetic airgap varies optimally as a function of the angle. The machined surface forms a progressive surface (e.g., FIG. 1, reference numeral 9).

The edge of the pole can be left sharp or bevelled or rounded. In the discussion of FIGS. 1–6, like reference numerals are used to indicate identical or similar features.

FIG. 1 shows a pole 1 having a curved surface 2 at its center, a plane surface at one end and a sharp edge 3.

The surface 2 constitutes the magnetically active part of the pole.

Amagnetic metal members 4 are disposed to either side of this magnetically active area, more generally to either side of the pole 1.

The amagnetic metal member 5 fills the gap between poles.

Figure 2:
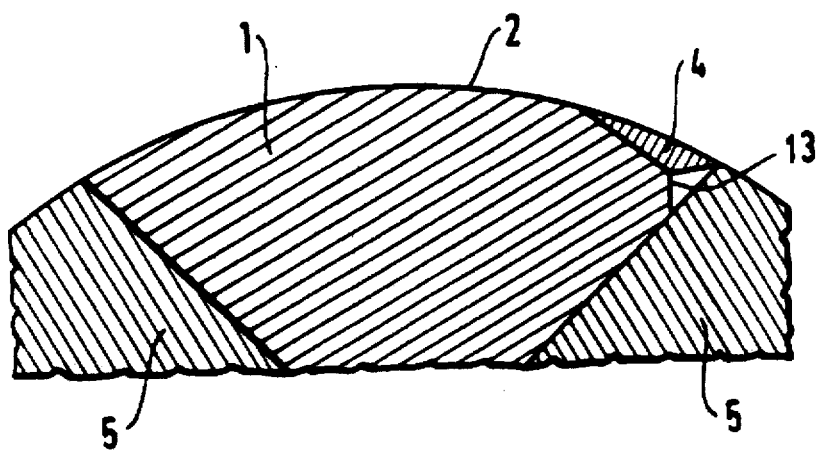

FIG. 2 shows a pole 1 having a curved surface 2 at its center, a plane surface at one end and a bevelled edge 13.

Figure 3:
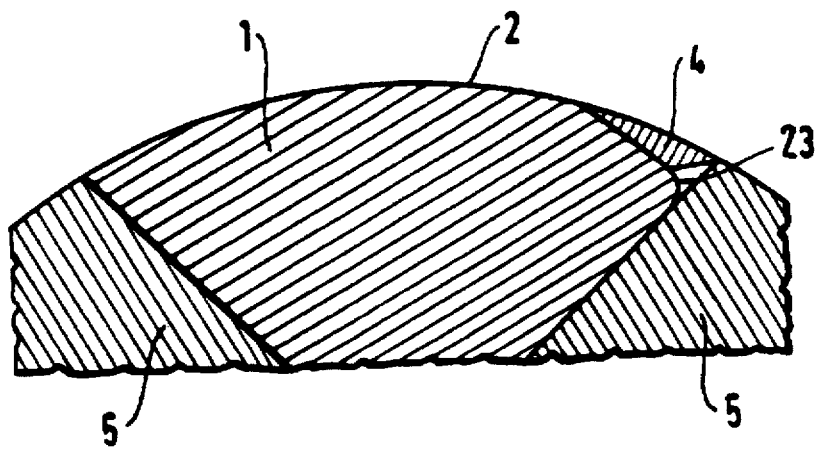

FIG. 3 shows a pole 1 having a curved surface 2 at its center, a plane surface at one end and a rounded edge 23.

Figure 4:
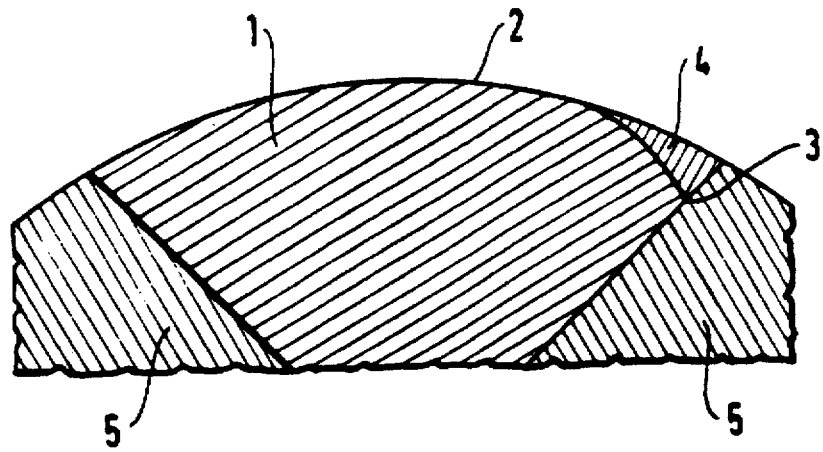

FIG. 4 shows a pole 1 having a curved surface 2 at its center and its ends and a sharp edge 3.

Figure 5:
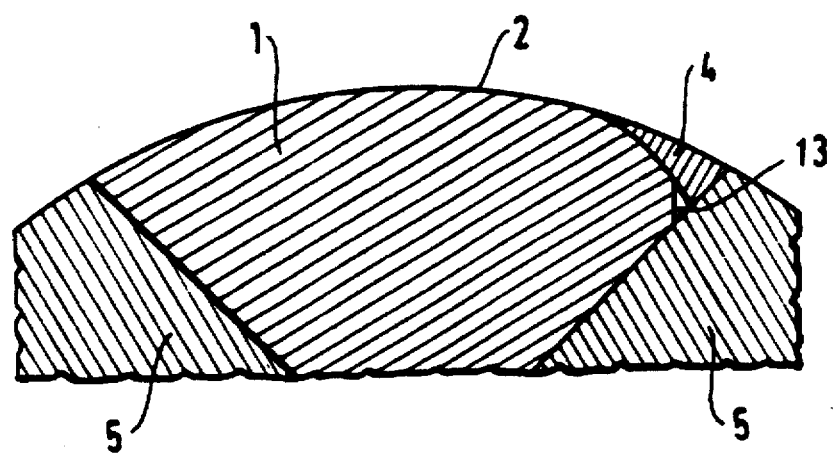

FIG. 5 shows a pole 1 having a curved surface 2 at its center and at its ends and a bevelled edge 13.

Figure 6:
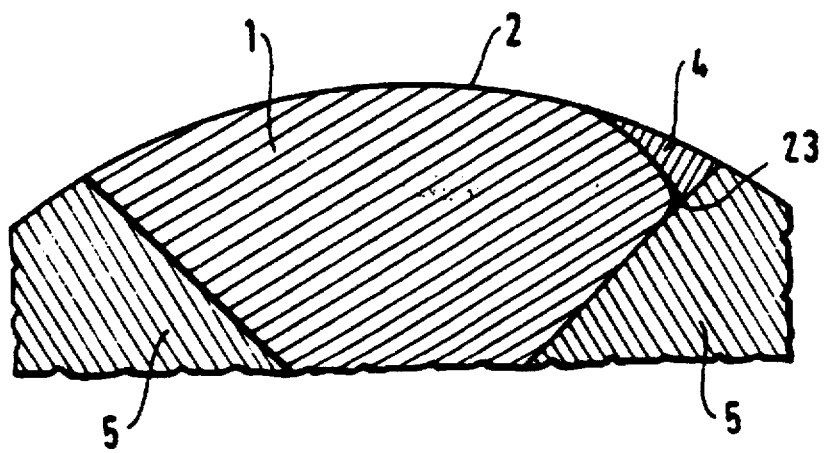

FIG. 6 shows a pole 1 having a curved surface 2 at its center and at its ends and a rounded edge 23.

In a first embodiment of the invention, the poles include a curved surface at their center and a plane surface in at least one of said progressive magnetic airgap areas and at least one sharp, bevelled or rounded edge.

In a second embodiment of the invention the poles include a curved surface at the center and in at least one of said progressive magnetic airgap areas and at least one sharp, bevelled or rounded edge.

To re-establish the constant aerodynamic airgap the invention replaces the missing magnetic steel with one or more wedge members 4 made from an appropriate amagnetic material such as austenitic stainless steel, which has the benefit of low cost, or an alloy based on nickel, copper, aluminum or magnesium, or an insulative material.

The wedge members 4 attached in this way to each tangential edge of the pole are generally wedge-shaped.

These members are assembled to the pole by welding, adhesive bonding or a combination of adhesive bonding and banding or, depending on the cost target and required mechanical performance characteristics, by conventional mechanical assembly means, for example bolting, riveting, crimping, dovetail joints or banding.

Rather than attaching wedge members 4, it is feasible and more economic to resurface the poles 1 in the progressive magnetic airgap area using an amagnetic material and the electric arc welding process.

After assembly by a known method of the two groups of poles constituting the rotor assembly and assembly of the wedge members to the poles, the rotor assembly is machined on a lathe to obtain the constant aerodynamic airgap, which is achieved even though the magnetic airgap is progressive.

When the poles are provided with wedge members at both tangential edges in this way, it can be highly advantageous to use these wedge members, which form a monolithic structure with the rotor, and to complement them with two further lateral members, also welded to the rotor, in order to constitute a damper turn around each pole.

Figure 7:
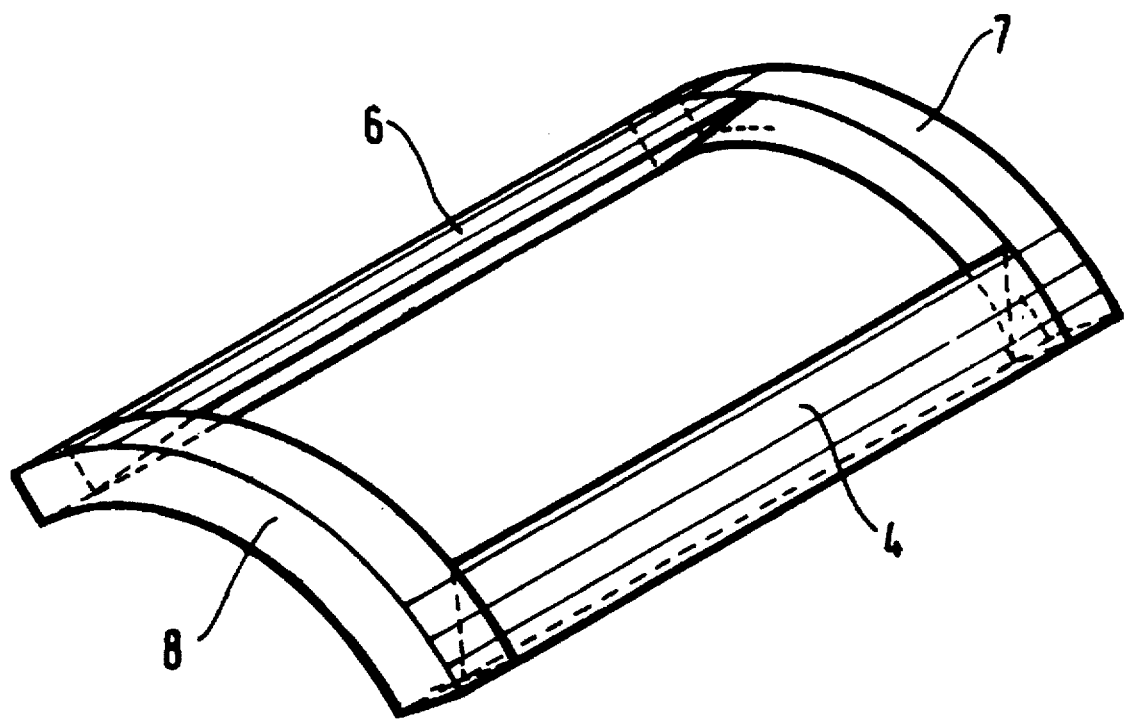
FIG. 7 shows a conductive amagnetic material damper turn.

FIG. 7 shows an electrically conductive amagnetic damper turn of this kind.

The material of the wedge members 4, 6 and the lateral members 7, 8 is a metal which is a good electrical conductor, for example, copper, low-alloy copper, copper-aluminum or aluminum.

The lateral members 7, 8 disposed at the axial edges of the poles are welded or otherwise assembled by the same method as the wedge members 4, 6 to the metal constituting the pole or to the amagnetic metal disposed on either side of the pole at the end of the magnetically active area. The turn is preferably a one-piece turn welded to the pole.

There is claimed:

1. A synchronous machine rotor having poles and being associated with a stator, wherein a surface of one of said poles defines a first surface and an outer surface of said rotor defines a second surface, there being a magnetic airgap between said first surface and said second surface of said stator, said magnetic airgap being progressive in a progressive magnetic airgap area of only one side of said pole, said aerodynamic airgap being constant, said progressive magnetic airgap area including a tangential edge area disposed at an edge of said pole and a centrally disposed area disposed closer to the center of said pole than said tangential edge area, and said progressive magnetic airgap being thinner at said centrally disposed area than at said tangential edge area; and having at least one amagnetic material progressive magnetic airgap area.

2. Synchronous machine rotor according to claim 1 having poles which include a curved surface at the center and a plane surface in at least one of said progressive magnetic airgap areas and at least one sharp edge.

3. Synchronous machine rotor according to claim 1 having poles which include a curved surface at the center and a plane surface in at least one of said progressive magnetic airgap areas and at least one bevelled edge.

4. Synchronous machine rotor according to claim 1 having poles which include a curved surface at the center and a plane surface in at least one of said progressive magnetic airgap areas and at least one rounded edge.

5. Synchronous machine rotor according to claim 1 having poles which include a curved surface at the center and in at least one of said progressive magnetic airgap areas and at least one sharp edge.

6. Synchronous machine rotor according to claim 1 having poles which include a curved surface at the center and in at least one of said progressive magnetic airgap areas and at least one bevelled edge.

7. Synchronous machine rotor according to claim 1 having poles which include a curved surface at the center and in at least one of said progressive magnetic airgap areas and at least one rounded edge.

8. Synchronous machine rotor according to claim 1 having wedge members which are complemented by lateral members to constitute an electrically conductive amagnetic material damper turn.

9. A synchronous rotor associated with a stator, comprising:
a plurality of poles, each pole having a cross-section defining a curved outer surface, flanking surfaces, and a progressive surface between said curved outer surface and a particular one of said flanking surfaces;

adjacent ones of said plurality of poles being separated by an amagnetic member contacting one of said flanking surfaces of each adjacent pole;

said progressive surface having a first end thereof closest to said curved outer surface and a second end thereof closest to said particular one of said flanking surfaces, said second end forming an edge with said particular one of said flanking surfaces; wherein:

said curved outer surface and said progressive surface define a first surface, an outer surface of said rotor defines a second surface, there is a magnetic airgap between said first surface and a surface of said stator, and an aerodynamic airgap between said second surface and said surface of said stator, said magnetic airgap at said progressive surface is progressive and defines a progressive magnetic airgap area, and is thinner at said first end of said progressive surface than at said second end of said progressive surface, said aerodynamic airgap is constant, and an amagnetic material is disposed in said progressive magnetic airgap area.

10. The synchronous machine rotor according to claim 9 wherein said progressive surface is a plane surface and said edge is a sharp edge.

11. The synchronous machine rotor according to claim 9 wherein said progressive surface is a plane surface and said edge is a beveled edge.

12. The synchronous machine rotor according to claim 9 wherein said progressive surface is a plane surface and said edge is a rounded edge.

13. The synchronous machine rotor according to claim 9 wherein said progressive surface is a curved surface and said edge is a sharp edge.

14. The synchronous machine rotor according to claim 9 wherein said progressive surface is a curved surface mad said edge is a beveled edge.

15. The synchronous machine rotor according to claim 9 wherein said progressive surface is a curved surface and said edge is a rounded edge.

16. The synchronous machine rotor according to claim 9 having wedge members which are complemented by lateral members to constitute an electrically conductive amagnetic material damper turn.

17. The synchronous machine rotor according to claim 9 wherein each of said plurality of poles has only one progressive magnetic airgap area.

* * * * *